Patented Jan. 14, 1936

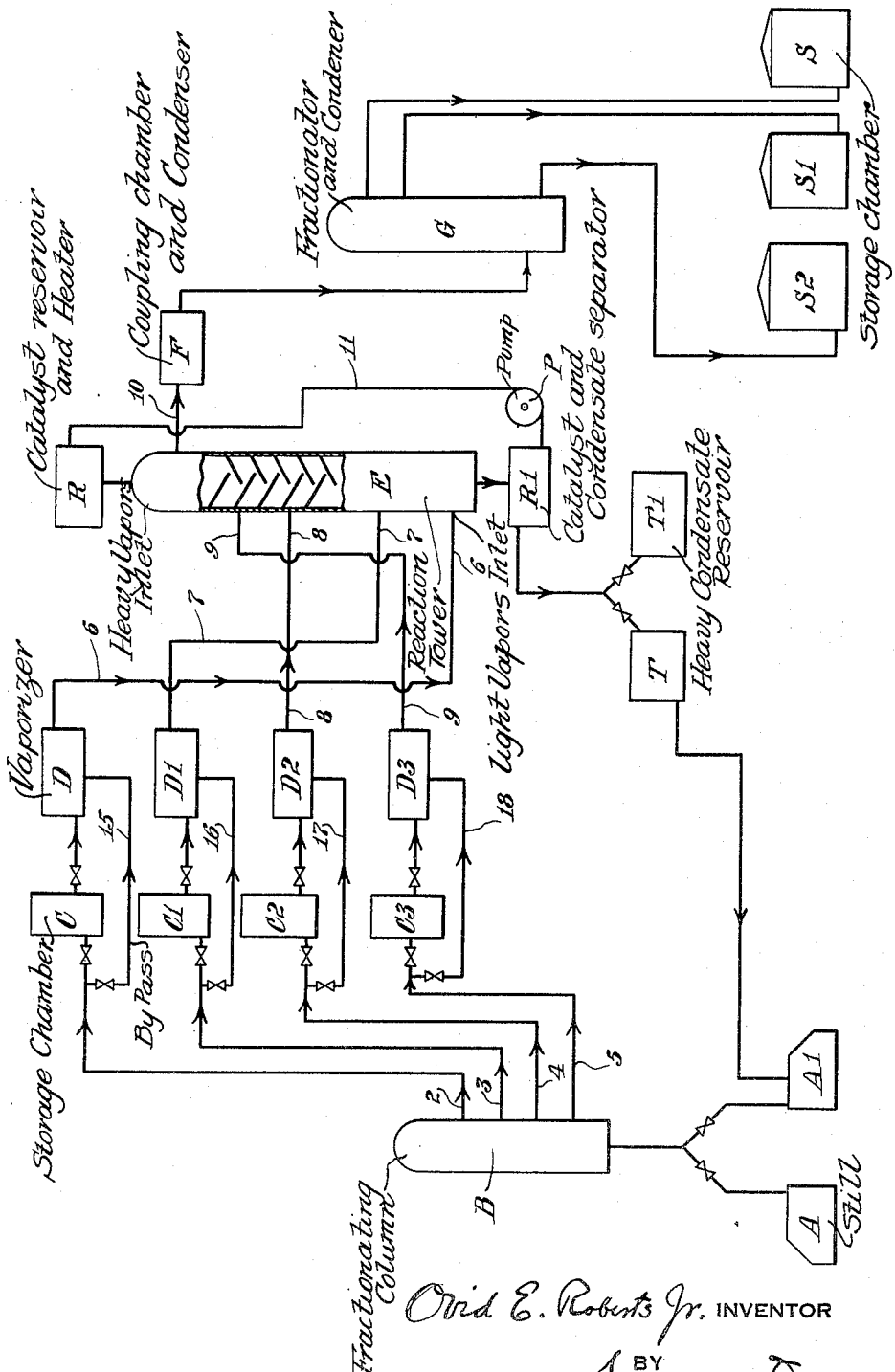

2,027,552

UNITED STATES PATENT OFFICE 2,027,552

PROCESS FOR CONTROLLED PYROGENIC DECOMPOSITION OF HYDROCARBONS

Ovid E. Roberts, Jr., New Rochelle, N. Y.

Application September 23, 1933, Serial No. 690,750

15 Claims. (Cl. 196—52)

My invention relates to methods of refining petroleum hydrocarbons. The principal objects of this invention are to decrease the amount of free carbon and fixed gases produced by the pyrogenic decomposition of petroleum and thereby to increase the yields from this type of reaction. Further objects are to effect such a molecular rearrangement of those products of said pyrogenic decomposition as will be highly conducive to stability in the ultimate products of said decomposition reaction after the attainment of equilibrium.

While the practice of decomposing the higher petroleum hydrocarbon molecules has been employed in the manufacture of the lighter hydrocarbons such as gasoline, all efforts to control the degree of such decomposition have met with unsatisfactory or indifferent results. This failure to prevent excessive, undesirable and unnecessary decomposition has resulted in a very high loss and a corresponding reduction of efficiency.

Competent authorities have advanced as an explanation of this decomposition reaction the following equation as typical of the molecular rearrangement encountered in the pyrogenic decomposition reaction employed in industrial operations:

Applying this equation to the specific petroleum hydrocarbon pentadecane $C_{15}H_{32}$, the reaction may be shown to be:

In this typical reaction, twenty-seven percent. of the pentadecane is lost as fixed gas, and almost twenty-one percent. as fixed carbon—a total of forty-seven percent. loss. This loss in yield as applied to the decomposition reaction represents a waste which I have discovered to be largely unnecessary.

My invention primarily consists in controlling or limiting the degree of decomposition of the molecule, and, by proper re-coupling or other rearrangement, in utilizing a high percentage of those lighter molecules which comprise the usual loss, whereby such prior waste is obviated and great economies are attained, as next hereinafter set forth.

In the application of the reaction which I describe herewith, I consider pressure to be atmospheric. In such consideration I do not limit myself to these conditions, as I fully realize that under many conditions the employment of higher pressures may result in higher yields and greater operating efficiencies, particularly in these reactions involving coupling, molecular rearrangement, polymerization, etc.

I have found that in the practice of pyrogenic decomposition of petroleum hydrocarbons, the formation of free carbon is essentially due to improper temperature control, and, more specifically, to overheating the molecules resulting from the initial decomposition reaction. This is particularly true in cases where these molecules are unsaturated, for example, olefines or diolefines. These continue to break down until a fixed gas, such as methane or hydrogen, and free carbon are the essential products of such conditions.

To avoid this condition, I treat the separate fractions of the overhead distillate under conditions which will avoid overheating of the various fractions; permit the more intimate contacting of the lighter gases with the higher unsaturates; provide a source of energy to induce coupling and/or molecular rearrangement; submit the more difficultly decomposed lighter compounds to a longer exposure to conditions conducive to such decomposition, and then react all unstable components of such decomposition together in as nearly a simultaneous series of reactions as the conditions of distillation and processing will permit.

In the accompanying drawing forming a part of this specification, I have indicated schematically conventional apparatus which is usable for the practice of the respective steps of my novel process.

This figure shows diagrammatically the steps incident to the treatment of a crude oil by my process. In this figure, stills A and A1 are shown as the source of vapors under treatment. I consider A and/or A1, not as the initial points in the treatment of a crude oil, but as the vaporization point of the charging stock under treatment. This stock may be any overhead distillate under atmospheric or higher pressure, or it may be lubricating oil stock under reduced pressure or vacuum.

Vapors from A and/or A1 are fractionated in B and distributed through lines 2, 3, 4, 5, to equalizing or storage tanks C, C1, C2, C3, etc. Under suitable operating conditions these vapors may by-pass these tanks via lines 15, 16, 17, 18, etc. direct to vaporizers D, D1, D2, and D3, etc., from which in vapor form they flow through lines 6, 7, 8, 9, etc. to enter reaction tower E. In E the vapors are subjected to conditions which are found to be conducive to decomposition and rearrangement. Vapors ascend through column E and find outlet through line 10 to chamber F, where they contact a zinc-copper couple. From this stage the hydrocarbons are subjected to such fractionation and/or condensation as their nature or utilization requirements may direct or necessitate. It may prove advantageous, for example, in the treatment of certain types of hydrocarbons by this process to react the vapors from F with a small amount of steam to insure more complete hydrocarbon recovery. It may also be advantageous to coupling to effect a certain amount of condensation in F.

By the division of the various fractions and reversing their usual reacting order in the zone of pyrogenic decomposition in E, I achieve several highly desirable and heretofore unattained results. I subject the lighter and more difficultly decomposed hydrocarbons to proportionately higher temperatures than customary and for proportionately longer periods of time, as compared with the higher molecules which are under treatment, and I enable the higher molecules, which more readily decompose, to be more rapidly removed from this reaction zone than is the case where standard methods of pyrogenic decomposition are employed.

I have found that the highest proportions of olefines and diolefines are most generally produced by the decomposition of the hydrocarbons at both extremes of the boiling range. By my method of reacting these, I effect a coupling reaction in the zone most highly energized and under conditions which are not known to present practice. This reaction is one which may in certain instances not require the treatment provided by reaction chamber F. This reaction, however, with a copper-zinc couple should prove highly desirable, particularly in cases where molecules containing sulfur or nitrogen atoms are involved, or where the diolefine content is high.

For clarity in explaining the operation of my procedure, I shall describe the reaction produced in E. This equipment I would describe as a reaction tower or other vessel suitable for the purpose of contacting hydrocarbon vapors and/or condensate with a suitable liquid, preferably a liquefied metal or alloy, in such a manner as to permit their rapid removal as well as the free removal of the metal. This liquid, flowing from chamber R, is heated to a sufficiently high temperature to induce pyrogenic decomposition in the vapors and/or liquids of the hydrocarbons with which it contacts. This contacting period is essentially a brief one. One of the failings of standard practice in this type of reaction is overheating, which is in itself a prime cause of excessive decomposition.

The periods of time for which the various fractions are exposed to conditions conducive to pyrogenic decomposition are controlled by:

1. The rate of flow of the vapors through the zone of decomposition (by variations of pressure, size of outlet or equivalent practice familiar to those skilled in the art).
2. Causing the vapors to enter tower "E" at a point which will increase or decrease the time of exposure of these vapors to the catalyst and forces of decomposition.

The temperature ranges in tower "E" are those required by:

1. The degree of efficiency developd in the contacting of the hydrocarbon vapors by the molten catalyst which will be characteristic of each tower or chamber "E" constructed.
2. The physical nature of the hydrocarbon under treatment in each particular instance. This will vary considerably with oils from various sources. In general, the more stable the crude, the higher the temperatures required.
3. The selection of the catalyst used and physical properties of same.
4. The rate of flow of vapors through "E".
5. The pressure under which "E" is operated.

It may be stated in a general way that to effect the control of the decomposition desired, the temperature of decomposition of the fluid catalyst should not exceed the temperature of decomposition of the most difficulty decomposed hydrocarbons, the decomposition of which is desired, by more than one hundred degrees. In many instances it will be found highly advantageous to so control this temperature that this difference may be as slight as ten to twenty degrees. The advantages of close temperature control are the production of a highly stable product and a minimum loss through any tendency to over-decompose. When the catalyst temperature is greatly in excess of the temperature at which the highest boiling fraction actually decomposes, more rapid removal of the vapors may be effected with a corresponding shortening of the contact period.

The metal catalyst may be heated directly or by such other means as may be desirable.

The motion of the metal flow produces several highly desirable results. It induces, promotes or otherwise forms currents, eddy and other, in the hydrocarbon vapors through which it passes and with which it contacts. This motion causes those molecules which contact the metal to be instantly removed from the contact area, thereby greatly assisting in a uniform transfer of heat throughout the zone of decomposition.

Aside from the production of conditions which permit a more accurate control of the pyrogenic decomposition reaction, the contacting of hydrocarbon vapors with a heated, fluid metal, or metallic alloy, produces effects which are highly desirable. These conditions are conducive to molecular rearrangement, which is essential if the products of this decomposition reaction are to form stable molecules.

In what specific manner this heated, fluid metal induces coupling or other molecular rearrangement, I am not entirely certain. It may be a thermionic effect or a reaction of a similar nature. The effect of the application of energy under these conditions is as described. The percentage of methane and the olefines usually produced by the pyrogenic decomposition reaction is very greatly reduced. The effect of this reduction is a direct increase in the efficiency of this reaction as gauged by the amounts of desired products resultant therefrom.

In my selection of the metal or metallic alloy to be employed, I prefer a bivalent metal or metals. From this group I exclude mercury. While mercury has certain properties which might permit its use, its reactivity is too high and its use is attended with other disadvantages.

The alkali metals I also exclude from consideration wherein I desire to effect coupling or other molecular rearrangement subsequent to pyrogenic decomposition. While these metals have long been known as catalysts for the promotion of polymerization, I find that at the temperatures I employ they are too highly reactive for this general type of operation. While the use of the alkali metals may appear to be justified by the quality of the resultant product, I have found that the increase in the yields of the reaction where their use is excluded or limited justifies such exclusion or limitation. I prefer an alloy containing lead for the purpose mentioned but do not limit myself to an alloy containing this metal. Small amounts of copper, antimony and/or zinc may be employed with desirable results, particularly in the treatment of an oil containing sulfur either as a mercaptan or in other form. What the mechanism, which is involved in the sulfur removal is, I am uncertain. It appears to be a form of polymerization in which higher sulfides are among the products of the reaction. These are fixed as metallic salts in some cases, as sulfides, polysulfides, etc. As examples of specific alloys which I would employ, I cite the following:

| | |
|---|---|
| 50 bismuth | |
| 27 lead | |
| 13 tin | Example A |
| 10 cadmium | |
| 50 bismuth | |
| 27 lead | Example B |
| 23 tin | |
| 85 lead | Example C |
| 15 antimony | |
| 50 lead | Example D |
| 50 tin | |
| 80 cadmium | Example E |
| 20 zinc | |
| 90 lead | Example F |
| 10 sodium | |
| 75 tin | |
| 12.5 antimony | Example G |
| 12.5 copper | |

The preceding are alloys which I find suitable for the reaction described. I cite the use of a lead-sodium alloy as Example F, as I have found that the low sodium content of this alloy makes its use an exception to my general and preferential practice of excluding the use of sodium, since in the proportions cited, the sodium is not highly reactive.

While I have shown in the drawing but one reaction tower or vessel E, it is within the scope of my invention to utilize more than one such tower in series, and also to vary the composition of alloys and/or temperatures employed in different towers so utilized. It is, further, within the scope of my invention so to fractionate the crude hydrocarbon mixture under treatment that, if and when desired, one set, or more than one set, of fractions may be treated in one tower, while another set, or other sets, may be treated in another tower, with or without recombination and blending.

Such a flexibility of operating manipulation is necessitated by the wide variations in the composition, physical as well as chemical, of the crude petroleum hydrocarbons encountered in refining operations. It is further necessitated by the desirability of blending different stocks to insure uniformity in the ultimate products marketed.

I have indicated a preference of a bivalent metal over univalent elements such as sodium or potassium because of the fact that a bivalent metal is more effective as a coupling or polymerizing catalyst. At higher temperatures such as would be encountered in this reaction, the proportion of univalent metal fixed is rather high. This reaction appears similar to the formation of a sodium-amine compound where hydrogen is replaced by sodium. Where a bivalent metal is used there may be a reaction involved in which certain metal-alkyl compounds are produced, but for the most part their formation appears to be but a step incident to coupling. Their formation is, if actual, but a step in the ultimate molecular rearrangement except in unusual instances.

Where metallic salts are products of the reaction they are carried down with a small amount of condensate, if such is formed, to R', which serves as a reservoir for the metal flowing through E. Such metallic salts because of their specific gravity may be drawn from the top of the metal surface. These are subjected to such treatment as their character and composition may warrant or necessitate.

The catalyst flow cycle is indicated as from R— through E to R1; thence returning through pump P via line 11 to R, etc.

Where metallic sulfides are formed, they may be converted into suitable compounds for use as pigments, insecticides, fungicides, or antiknock components.

These condensate liquors and/or metallic salts may be treated as by steam, acid or alkali, or a combination thereof, for the purpose of recovery of the hydrocarbon and/or the metal radical.

The metallic salts obtained from this source I find suitable for utilization as sources of useful organic compounds, known or adaptable for use in the production of intermediate compounds in the preparation of organic dyes and other similar useful products.

The above treatment of this condensate is indicated in the drawing as taking the liquid which condenses in E, and settling on top of the metal catalyst in R, and drawing same to chambers T or T—1. This may be subjected to redistillation, as indicated; or may, by such other or further suitable treatment as its nature might require, be converted into lubricating oil, or the like.

After leaving the reaction chamber E, it is within the scope of my invention to maintain the vapors at substantially the same pressure but slightly lower temperatures in F to induce or accelerate coupling and thereby increase the consumption of such gases as hydrogen, methane, ethane, and the like.

From F, the vapors are subjected to the necessary fractionation and condensation in chamber or chambers G, and carried to storage in chambers S, S1, S2, etc.

I have found, where pyrogenic decomposition is controlled in the manner above indicated, that the lubricating stock so produced is very light in color. I explain this absence of the usual color characteristics by the fact that in the first place a lower percentage of free carbon and other suspensoids are formed by this method of temperature control, and also by the clarifying effect of a lacquer-like, tarry class of substances, which appears to agglomerate the suspensoids. Whether this is or is not a complete explanation of the phenomenon, I am unprepared to state. On vacuum or steam distillation, the condensate from T1 is quite unlike the distillate of corresponding range encountered in the processing of hydrocarbons by methods in vogue commercially.

By the preferred example of contact agent described, i. e. liquefied metal or metallic alloy, I do not intend to be understood as implying a limitation excluding any suitable liquid agent, as in certain classes of hydrocarbon vapors and/or their condensates, a heavy oil may effectively and advantageously be employed.

Having thus described the nature of my invention and means for practicing same, but without intending thereby to limit my invention to such specific means, save as expressly set forth in the appended claims, I claim as new:

1. The method of effecting pyrogenic decomposition of hydrocarbons comprising fractionating a hydrocarbon mixture; segregating the fractions; decomposing these fractions in the vapor phase by flowing them through a reaction zone while simultaneously contacting the same with a liquid metallic catalyst flowing counter-currently through the reaction zone, each fraction being separately introduced into said reaction zone to contact the liquid catalyst at points which afford the optimum conditions of pyrogenic decomposition and coupling necessary for proper stabilization.

2. In a method as described in claim 1, the step of introducing a lower boiling fraction at a point in the zone requiring greater time contact with the flow of catalyst than a higher boiling fraction.

3. In a method as described in claim 1, in which the catalyst comprises essentially a bivalent metal.

4. In a method as described in claim 1, in which any liquid product formed in the reaction zone flows counter-current to ascending vapors.

5. In a method as described in claim 1, the step of using superatmospheric pressures to effect optimum coupling and stabilization.

6. In the method as described in claim 1, the additional step which consists in recycling liquid hydrocarbon from the reaction zone to the charging stock for fractionation.

7. In a method as described in claim 1, in which the catalyst comprises a metallic alloy containing a component of the order of 10 per cent of a univalent metal.

8. The method of effecting pyrogenic decomposition of hydrocarbons comprising decomposing a plurality of hydrocarbon fractions of different boiling points in the vapor phase by flowing them through a reaction zone while simultaneously contacting the same with a liquid metallic catalyst flowing counter-currently through the reaction zone, each fraction being separately introduced into said reaction zone to contact the liquid catalyst at points which afford the optimum conditions of pyrogenic decomposition and coupling necessary for proper stabilization.

9. In a method as described in claim 8, the step of introducing a lower boiling fraction at a point in the zone requiring greater time contact with the flow of catalyst than a higher boiling fraction.

10. In a method as described in claim 8, in which the catalyst comprises essentially a bivalent metal.

11. In a method as described in claim 8, in which any liquid products formed in the reaction zone flow counter-current to ascending vapors.

12. In a method as described in claim 8, the step of using superatmospheric pressures to effect optimum coupling and stabilization.

13. In the method as described in claim 8, the additional step which consists in recycling liquid hydrocarbon from the reaction zone to the charging stock for fractionation.

14. In a method as described in claim 8, in which the catalyst comprises a metallic alloy containing univalent metal.

15. In a method as described in claim 1, in which the catalyst comprises a metallic alloy containing a univalent metal.

OVID E. ROBERTS, Jr.